(12) United States Patent
Li

(10) Patent No.: US 10,140,113 B2
(45) Date of Patent: Nov. 27, 2018

(54) DATA PROCESSING METHOD AND DEVICE OF PRESET APPLICATION AFTER UPGRADING

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventor: Xin Li, Qingdao (CN)

(73) Assignees: HISENSE ELECTRIC CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/394,750

(22) Filed: Dec. 29, 2016

(65) Prior Publication Data
US 2017/0308369 A1    Oct. 26, 2017

(30) Foreign Application Priority Data

Apr. 25, 2016   (CN) .......................... 2016 1 0262060

(51) Int. Cl.
| | |
|---|---|
| *G06F 9/445* | (2018.01) |
| *G06F 8/65* | (2018.01) |
| *G06F 17/30* | (2006.01) |

(52) U.S. Cl.
CPC .......... *G06F 8/65* (2013.01); *G06F 17/30106* (2013.01); *G06F 17/30117* (2013.01)

(58) Field of Classification Search
None
See application file for complete search history.

(56) References Cited

U.S. PATENT DOCUMENTS

| | | | |
|---|---|---|---|
| 8,607,218 B2 * | 12/2013 | Motta ...................... | G06F 8/65 717/168 |
| 2008/0178173 A1 | 7/2008 | Sriram et al. ................ | 717/176 |

FOREIGN PATENT DOCUMENTS

| | | |
|---|---|---|
| CN | 103514006 A1 | 1/2014 |
| CN | 103761126 A1 | 4/2014 |
| CN | 104536775 A1 | 4/2015 |

OTHER PUBLICATIONS

The Chinese First Examination Report of corresponding China patent application No. 201610262060.X, dated Jul. 2, 2018.

* cited by examiner

*Primary Examiner* — Chuck Kendall
(74) *Attorney, Agent, or Firm* — J.C. Patents

(57) ABSTRACT

The present application provides a data processing method for a preset application, including: after upgrading the preset application, comparing a first application package of preset application after upgrading in a data partition with a second application package of preset application before upgrading in a system partition; deleting each file in the first application package which is identical with that in the second application package in accordance with a comparison result; after the deleting, adding reduction identification information in the first application package, wherein the reduction identification information is used for: when the preset application after upgrading is started, a program file is loaded from the first application package after the deleting and the second application package, respectively, in accordance with the reduction identification information.

20 Claims, 2 Drawing Sheets

DATA PROCESSING METHOD AND DEVICE OF PRESET APPLICATION AFTER UPGRADING

CROSS REFERENCE TO RELATED APPLICATIONS

The present application claims priority to Chinese patent application No. 201610262060.X, entitled "DATA PROCESSING METHOD AND DEVICE OF PRESET APPLICATION AFTER UPGRADING" filed with the SIPO on Apr. 25, 2016, the contents of which are incorporated herein by reference in its entirety.

TECHNICAL FIELD

The present application relates to the field of computer technologies, and particularly to a data processing method and device for a preset application.

BACKGROUND

In general, some applications, which are referred to as preset applications, such as alarm applications, music player and the like on a smart phone, tend to be preset in an operation system of an intelligent terminal by manufacturers, and software vendors usually provide upgrade packages on regular basis for the preset applications on an intelligent terminal for implementing the upgrade of the preset application in an effort to boost the user's experience. In related technologies, an application package of a preset application in an Android system is usually stored under a preset directory, such as the /system/app directory in a system partition; when a preset application undergoes self-upgrade, since the system partition of a system is only capable of conducting a read operation, and modification and other operations are usually not available when a root permission is not acquired, the system will store the application package of an upgraded application under a preset installation directory, such as the /data/app directory in a user data partition, while the application package in the system partition is still reserved.

SUMMARY

The present application provides a data processing method and device for a preset application.

In a first aspect, the present application provides a data processing method for a preset application, including:

after upgrading the preset application, comparing a first application package of the preset application after upgrading in a data partition with a second application package of the preset application before upgrading in a system partition;

deleting each file in the first application package which is identical with that in the second application package in accordance with a comparison result;

after the deleting, adding reduction identification information in the first application package, wherein the reduction identification information is used for: when the preset application after upgrading is started, a program file is loaded from the first application package after the deleting and the second application package, respectively, in accordance with the reduction identification information.

In a second aspect, the present application provides a data processing device for a preset application, including: a memory, configured to store instructions; and a processor, coupled with the memory and configured to execute the instructions stored in the memory and configured to:

compare a first application package of the preset application after upgrading in a data partition with a second application package of the preset application before upgrading in a system partition, after upgrading the preset application;

delete each file in the first application package which is identical with that in the second application package in accordance with a comparison result; and after the deleting, add reduction identification information in the first application package, wherein the reduction identification information is used for: when the preset application after upgrading is started, a program file is loaded from the first application package after the deleting and the second application package, respectively, in accordance with the reduction identification information. And the reduction identification information is configured to, when the preset application after upgrading is started, indicate the application to firstly access the file of any one application package of the first application package and the second application package, and to redirect to the file of another application package to search if the resources being accessed are not found.

BRIEF DESCRIPTION OF THE DRAWINGS

For the purpose of describing technical solutions in embodiments of the present application or related technologies more clearly, drawings required for describing the embodiment or the related technologies will be briefly introduced in the following context; obviously, the drawings as follows are just part of the embodiments of the present application, and other drawings may also be obtained in accordance with the drawings by those skilled in the art without delivering creative efforts.

DESCRIPTION OF EMBODIMENTS

In order to make the purpose, technical solutions and advantages of embodiments of the present application clearly, the technical solution in the embodiments of the present application will be rendered clearly and completely in conjunction with drawings accompanying the embodiments of the present application. Apparently, the described embodiments are part rather than all of embodiments of the present application. And all the other embodiments acquired by those skilled in the art based on the embodiments of the present application without delivering creative efforts shall fall into the protection scope of the present application.

An intelligent terminal involved in the embodiments of the present application includes but is not limited to intelligent terminal equipment, such as smart phones, tablet computers, etc., in the following embodiments, the smart phone alone is taken as an example.

Figure 1:
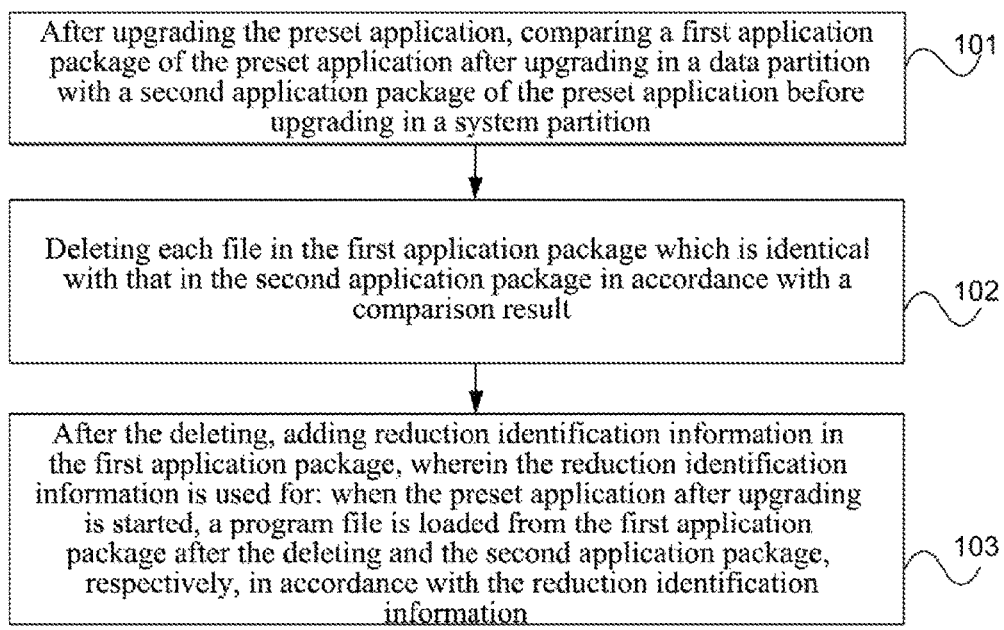
FIG. 1 is a flow diagram of a data processing method for a preset application provided by an embodiment of the present application.

FIG. 1 is a flow diagram of a data processing method for a preset application provided by an embodiment of the present application. As shown in FIG. 1, the method in the present embodiment includes:

step 101: after upgrading the preset application, comparing a first application package of the preset application after upgrading in a data partition with a second application package of the preset application before upgrading in a system partition;

step 102: deleting each file in the first application package which is identical with that in the second application package in accordance with a comparison result;

step 103: after the deleting, adding reduction identification information in the first application package, wherein the reduction identification information is used for: when the preset application after upgrading is started, a program file is loaded from the first application package after the deleting and the second application package, respectively, in accordance with the reduction identification information.

In the intelligent terminal, the preset application refers to an application already installed in a phone before delivery, where an application package of the preset application is stored in a system partition, and an increasing number of preset applications are capable of self-upgrade, which may be upgrade through manually downloading upgrade packages or auto-upgrade, where the auto-upgrade refers to a situation in which the preset application automatically detects the latest version for self-upgrade during the intelligent terminal is connected to the internet, and pops up a window for enquiring whether a user is about to conduct the upgrade, and the user can select upgrade or cancel upgrade as practically needed.

The application package of the preset application is usually stored in a system partition, for example, in /system partition of an Android system. Since the system partition is a read-only one in default settings, file in the system partition can be changed only when the whole device upgrade is carried out, which is to say, the application packages of various system applications in the system partition are able to be upgraded when the system of a whole device is upgraded. However, when the preset application undergoes self-upgrade, data in the system partition is not permitted to be changed. For example, preset applications of the Android system are typically stored under /system/app directory, and generally, ordinary users are not granted the operation permission to delete or write the preset applications stored in the above specific directory, except the permission to read and execute the preset applications stored in the above specific directory. Therefore, applications installed subsequently by the user and application packages of the preset applications after self-upgrading are normally stored under the /data/app directory, the ordinary users usually have a higher-level permission, such as, capability to read, execute, write, delete and other operation, for the applications under the above installation directory.

After self-upgrading the preset application, a new application package will be installed under the user data partition, and will be stored by the Android system under the /data/app directory.

For example, an application package Sample.apk of version 10 is originally preset under the /system/app directory, after the self-upgrade, an application package com.sample.apk of version 11 will be installed under the /data/app directory, where the name of the apk is the package name of the preset application.

The application package of version 11 will be used when the system calls the preset application subsequently.

Current applications, growing in both variety and complexity, are usually tens of mega bytes (MB) in size per se, with the space being mainly occupied by all kinds of images, audios, and video resources.

Files decompressed from a typical Android application, shown as table 1:

TABLE 1

| | |
|---|---|
| Android Manifest.xml | Application description files, including version numbers, etc. |
| assets | Primary Raw format resources |
| classes.dex | Code byte code files |
| lib | Used dynamic library |
| META-INF | Signature information |
| res | a directory of resource files, including xml files describing page layout, and image files fit for different sizes |
| resource. arsc | Text information resources |

The application packages of the applications after self-upgrading stored under the /data/app directory may not differ much from the application package stored under the /system/app directory, except for changes in part of files, such as in part of resource files, code files, description files, etc., or addition of part of resource files, whereas a large amount of other resource files which undergo no change are usually located under the res directory.

The space is quite strained after installation of multiple applications, since the capacity of the user data partition of an intelligent terminal is limited, for example, between 1 GB and 3 GB.

As a result, in the embodiments of the present application, after self-upgrading a preset application, the upgraded application package is automatically processed, so as to remove duplicate resources in the first application package of the data partition relative to the second application package in the system partition, because part of resources have already existed in corresponding application package under the system partition. In such way, storage space occupied by the preset application under the user data partition is significantly reduced, thereby freeing up more storage space in the user data partition.

Steps are shown as follows:

Firstly, a first application package is located under the /data/app directory of a data partition after self-upgrading a preset application, i.e., after downloading and installing a new upgrade package.

Comparing the first application package in the data partition with a second application package of the preset application before upgrading in the system partition. For example, differential files of the first application package relative to the second application package may be obtained, where the differential files may include: files with the identical name as the second application package but with different contents, and additional files relative to the second application package. Alternatively, identical files may also be obtained directly. Then in accordance with the comparison result, the identical files in the first application package in the data partition as those in the second application package are deleted. In such a manner, there will be no duplicate files in the system partition and the data partition regarding the application package of the preset application, thus saving storage space, and part of the storage space can be released from the data partition to install other applications.

Finally, after the deleting, reduction identification information is added in the first application package, where the reduction identification information is used for: when the preset application after upgrading is started, a program file is loaded from the first application package after the deleting and the second application package, respectively, in accordance with the reduction identification information.

The reduction identification information may be added in application description file of the first application package. After the preset application is started, the resources are loaded through a resource manager of the system, in such case, the program file are firstly loaded under the /data/app directory if the first application package contains the reduction identification information; and the files under the corresponding /system/app directory are redirected to search when the resources being accessed are not found under the files of the /data/app directory, such that the resources can be loaded normally at this moment, since the consistent file exists all the time and only one copy thereof is preserved. Or when the resources are loaded by the resource manager, the program file are firstly loaded under the/system/app directory if the first application package contains the reduction identification information, and in the case when the resources being accessed are not found under the files of the /system/app directory, the files under the corresponding /data/app directory are redirected to search, such that the resources can be loaded normally, since inconsistent files are only preserved in the first application package and will not be deleted.

Through the above method step, the preset application is able to be used normally after data processing, while reducing unnecessary occupation of the space in the data partition.

In the data processing method for a preset application provided by this embodiment, after upgrading a preset application, comparing a first application package of the preset application in the data partition with a second application package of the preset application in a system partition; deleting each file in the first application package which is identical with that in the second application package in accordance with a comparison result; after the deleting, adding reduction identification information in the first application package, wherein the reduction identification information is used for: when the preset application after upgrading is started, a program file is loaded from the first application package after the deleting and the second application package, respectively, in accordance with the reduction identification information, and because of removal of duplicate resources in the first application package of the data partition relative to the second application package in the system partition, storage space occupied by the preset application in the data partition is reduced, thereby freeing up more storage space in the user data partition, and because the addition of the reduction identification information, the program file is loaded from the data partition and the system partition, respectively, in accordance with the reduction identification information when the preset application after upgrading is started, without affecting normal startups of the applications, addressing problems such as repeated occupation of the storage space and resource waste in the related technologies.

On the basis of the above embodiment, comparing the first application package and the second application package, and there are more than one approach to realize acquisition of differential files, among which one option adopted by this embodiment is that, the following operations may also be performed before step 101:

decompressing the first application package, so as to acquire files of the first application package after decompressing;

decompressing the second application package, so as to acquire files of the second application package after decompressing;

Step 101 may adopt the following approach to be realized:

comparing the files of the first application package after decompressing with the files of the second application package after decompressing.

wherein, in practical application, step 102 may adopt the following approach to be realized:

deleting each file in the first application package after decompressing which is identical with that in the second application package after decompressing in accordance with the comparison result.

After self-upgrading the preset application, re-decompressing the first application package located under the /data/app directory in the data partition, thus generating a file directory A1, acquiring files of the first application package after decompressing; and re-decompressing the second application package in the system partition, thus generating a file directory A2, so as to acquire files of the second application package after decompressing; comparing the difference among all sorts of resource files in the two file directories, and deleting files in the file directory A1 identical with those in the file directory A2.

For example, a binary comparison algorithm (such as the bsdiff algorithm, a binary differential algorithm) may be employed for computing to obtain the difference files or the identical files between the first application package after decompressing and second application package after decompressing.

In the above implementation, the decompression of the application package realizes the technical solution of how to compare and delete the files, while reducing occupation of the storage space by the application package after upgrading.

On the basis of the above embodiment, in an effort to further reduce occupation of the storage space by the data partition, after the deleting the file in the first application package after decompressing which is identical with that in the second application package after decompressing in accordance with the comparison result:

compressing remaining file of the first application package in the data partition, so as to acquire a third application package, and replacing the first application package after the deleting according to the third application package.

Repackaging the differential files in the data partition, thus acquiring the third application package, replacing the original first application package under the /data/app directory, at this point, the storage space occupied by the third application package is greatly reduce compared with that occupied by the first application package.

On the basis of the above embodiment, the following operations may also be performed before step 101:

determining whether the first application package contains the reduction identification information.

before the comparison, firstly determining whether the first application package contains the reduction identification information, if so, it demonstrates that the process has already been conducted, and such a process is no longer needed.

On the basis of the above embodiment, in the method of this embodiment, the following operations may also be performed:

when the preset application after upgrading is started, determining whether the first application package contains the reduction identification information;

if so, loading the program file from the first application package after the deleting and the second application package, respectively, in accordance with the reduction identification information.

when the preset application after upgrading is started, determining whether the first application package contains the reduction identification information, if the first application package contains the reduction identification information, loading the program file firstly under the /data/app directory; and if the resources being accessed are not found under the files of the /data/app directory, redirecting to files under the corresponding /system/app directory to search, so that the resources can be loaded normally at this moment, since the consistent file is existing all the time and only one copy thereof is preserved, and the preset application after upgrading is able to be started normally.

Figure 2:
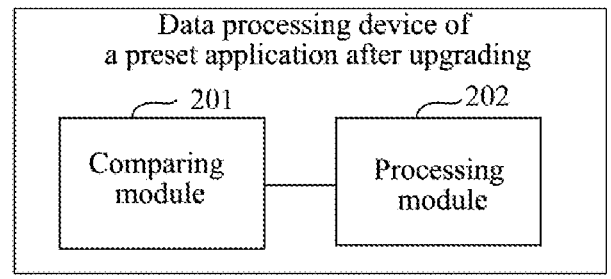
FIG. 2 is a structural diagram of the data processing device for a preset application provided by an embodiment of the present application.

FIG. 2 is a structural diagram of the data processing device for a preset application provided by an embodiment of the present application. As shown in FIG. 2, the data processing device for a preset application in the present embodiment includes:

a comparing module 201 and a processing module 202;

wherein, the comparing module 201 is configured to, after the preset application is upgraded, compare a first application package of the preset application after upgrading in a data partition with a second application package of the preset application before upgrading in a system partition;

the processing module 202 is configured to delete each file in the first application package which is identical with that in the second application package in accordance with a comparison result;

the processing module 202 is also configured to add reduction identification information in the first application package after the deleting, wherein the reduction identification information is used for: when the preset application after upgrading is started, a program file is loaded from the first application package after the deleting and the second application package, respectively, in accordance with the reduction identification information.

In an intelligent terminal, an increasing number of preset applications are capable of self-upgrade, which may be upgrade through manually downloading upgrade packages or auto-upgrade, where the auto-upgrade refers to a situation in which the preset application automatically detects the latest version for self-upgrade during the intelligent terminal is connected to the internet, and pops up a window for enquiring whether a user is about to conduct the upgrade, and the user can select upgrade or cancel upgrade as practically needed.

The preset application is stored in the system partition, i.e., in the /system partition; because the system partition is a read-only partition, and can be changed only when the whole device undergoes differential upgrade, at that time, all kinds of system applications are upgraded. However, when the preset application undergoes self-upgrade, data in the system partition will not be changed. For example, preset applications in the Android system are typically stored under the /system/app directory, and generally, ordinary users are not granted the operation permission to delete, write and the like, except the permission to read and execute the preset applications stored in the above specific directory; the applications and application packages of preset applications after self-upgrading subsequently installed by a user are usually stored under the /data/app directory, and generally, ordinary users have a higher-level permission, such as the capability to carry out operations like read, execute, write, etc., to the applications under the above installation directory.

After self-upgrading a preset application, a new application package will be installed in the user data partition, the Android system usually store the application package under the /data/app directory.

For example, an application package Sample.apk of version 10 is originally preset under the /system/app directory, after the self-upgrade, an application package com.sample.apk of version 11 will be installed under the /data/app directory, wherein the name of the apk is the package name of the preset application.

The application package of version 11 will be used when a system calls the preset application subsequently.

The current applications, growing in both variety and complexity, are usually tens of mega bytes (MB) in size per se, with the space being mainly occupied by all kinds of images, audios, and video resources.

Files decompressed from a typical Android application, shown as table 1. The application packages of the applications after self-upgrading stored under the /data/app directory may not differ much from the application package stored under the /system/app directory, except for changes in part of files, such as in part of resource files, code files, description files, etc., or addition of part of resource files, whereas a large amount of other resource files which undergo no change are usually located under the res directory.

The space is quite strained after installation of multiple applications, since the capacity of the user data partition of a normal intelligent terminal is limited, for example, between 1 GB and 3 GB.

As a result, in the embodiments of the present application, after self-upgrading a preset application, the upgraded application package is automatically processed, so as to remove duplicate resources in the first application package of the data partition relative to the second application package in the system partition, because part of resources have already existed in a corresponding application package under the system partition. In such way, storage space occupied by the preset application under the user data partition is significantly reduced, thereby freeing up more storage space in the user data partition.

Steps are as follows:

Firstly, a first application package is located under the /data/app directory of a data partition after self-upgrading a preset application, i.e., after downloading and installing a new upgrade package.

Comparing, by the acquisition module, the first application package in the data partition with a second application package of the preset application before upgrading in the system partition, for example, obtaining differential files of the first application package relative to the second application package, where the differential files include: files with the identical name as the second application package but with different contents, and also include additional files relative to the second application package; alternatively, directly obtaining identical files; then by the processing module, in accordance with the comparison result, deleting the identical files of the first application package in the data partition as those in the second application package. In such manner, there will be no duplicate files in the system partition and the data partition regarding the application package of the preset application, thus saving storage space, and part of the storage space can be released from the data partition to install other applications.

Finally, by the processing module, after the deleting, reduction identification information is added in the first application package, wherein the reduction identification information is used for: when the preset application after upgrading is started, a program file is loaded from the first application package after the deleting and the second application package, respectively, in accordance with the reduction identification information.

The reduction identification information may be added in application description file of the first application package.

After the preset application is started, the resources are loaded through a resource manager of the system, in such case, the program file are firstly loaded under the /data/app directory if the first application package contains the reduction identification information; and the files under the corresponding /system/app directory are redirected to search when the resources being accessed are not found under the files of the /data/app directory, such that the resources can be loaded normally at this moment, since the consistent file exists all the time and only one copy thereof is preserved.

Through the above step of the method, the preset application is able to be used normally after data processing, while greatly reducing unnecessary occupation of the space in the data partition.

An implementable approach also includes: an acquisition module which is configured:

to decompress the first application package, so as to acquire files of the first application package after decompressing;

to decompress the second application package, so as to acquire files of the second application package after decompressing;

the comparing module 201 is configured to:

compare the files of the first application package after decompressing with the files of the second application package after decompressing.

As an implementable approach, the processing module 202 is configured to:

delete a file in the first application package after decompressing which is identical with that in the second application package after decompressing in accordance with the comparison result.

As an implementable approach, the processing module 202 is also configured:

to compress remaining file of the first application package in the data partition, so as to acquire a third application package, and to replace the first application package after the deleting according to the third application package.

As an implementable approach, the comparing module is also configured to:

determine whether the first application package contains the reduction identification information.

As an implementable approach, the processing module 202 is also configured to:

determine whether the first application package contains the reduction identification information when the preset application after upgrading is started;

if so, load program file from the first application package after the deleting and the second application package, respectively, in accordance with the reduction identification information.

The device in the present embodiment may be configured to execute the technical solutions in the embodiment of the method as shown in FIG. 1, and has a principle and technical effects similar to the latter, which will not be repeated herein.

The present application also provides a data processing device for a preset application, including: a memory, which is configured to store instructions; a processor, which is coupled with the memory and is configured to execute the instructions stored in the memory and is configured to, after upgrading a preset application, to compare a first application package of the preset application after upgrading in a data partition with a second application package of the preset application before upgrading in a system partition; to delete each file in the first application package which is identical with that in the second application package in accordance with a comparison result; and to add reduction identification information in the first application package after the deleting, wherein the reduction identification information is used for: when the preset application after upgrading is started, a program file is loaded from the first application package after the deleting and the second application package, respectively, in accordance with the reduction identification information.

In the data processing device for a preset application of the present embodiment, the processor may also be configured to execute a control method of any backlight source provided by the foregoing embodiments of the present application, under a similar principle which will not be repeated herein.

The present application also provides a nonvolatile computer readable medium, with a set of instructions stored thereon, enabling a machine to execute the data processing method of a preset application after upgrading when the set of instructions is executed, the method includes: after upgrading a preset application, comparing a first application package of the preset application after upgrading in a data partition with a second application package of the preset application before upgrading in a system partition; deleting each file in the first application package which is identical with that in the second application package in accordance with a comparison result; and after the deleting, adding reduction identification information in the first application package, wherein the reduction identification information is used for: when the preset application after upgrading is started, a program file is loaded from the first application package after the deleting and the second application package, respectively, in accordance with the reduction identification information.

The nonvolatile computer readable medium in the present embodiment may also be configured to execute any data processing method of a preset application after upgrading provided by the foregoing embodiments of the present application, under a similar principle, which will not be repeated herein.

Figure 3:
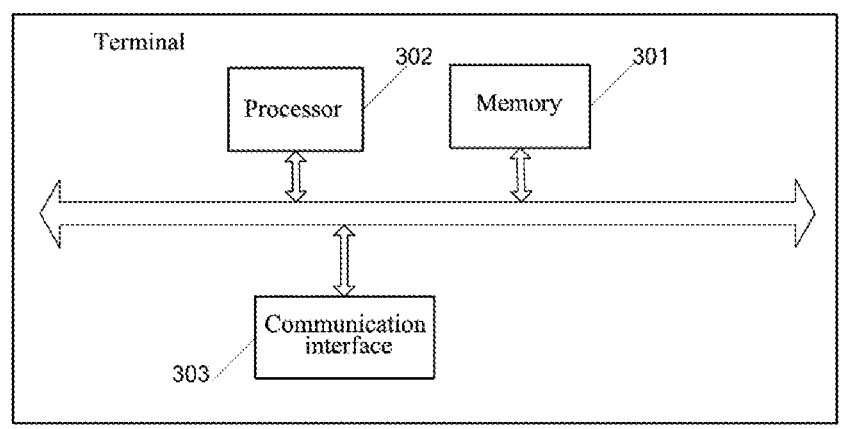
FIG. 3 is a structural diagram of a terminal provided by an embodiment of the present application.

FIG. 3 is a structural diagram of a terminal provided by an embodiment of the present application. As shown in FIG. 3, the terminal in the present embodiment may include: a memory 301, a processor 302 and a communication interface 303; wherein the memory 301 is configured to store a program; the program may include program codes, which include computer operation instructions. The memory 301 may include a random access memory (a random access memory, briefly referred to as a RAM), and may also include a nonvolatile memory (a non-volatile memory), for example at least one magnetic disk memory.

The processor 302 is configured to execute the program stored in the memory 301, and to execute the technical solutions provided by the method embodiment of the present application, under a similar principle and technical effects, which can be referred to the method embodiment as illustrated in FIG. 1, and will not be repeated herein.

The communication interface 303 is configured to receive a button processing request;

The foregoing device may be arranged in the terminal of the present embodiment, and functions of the processing module, the comparing module and the acquisition module in the foregoing device may be realized through the processor 302.

The above components conduct communication through one or multiple buses. Those skilled in the art may understand that, the structure of the terminal shown in FIG. 3 may be a bus-like structure or a star-like structure, may also include components fewer or more than those shown in the figures, or a combination of certain components, or different arrangement of the components, and thus does not constitute a limitation to the present application.

It should be noted that, regarding the embodiment of a terminal, the relevant contents thereof are referred to part of the description for the method embodiment, since the former is basically corresponding to the latter.

Those skilled in the art may understand: part or all of the steps for achieving the embodiments of the above method may be completed via a hardware related to program instructions, the foregoing program may be stored in a computer readable storage medium, and a step including the embodiment of the above method is executed during execution by the program; the foregoing storage medium includes: various media, such as ROMs, RAMs, magnetic disks, optical disks, etc., capable of storing program codes.

Finally, it should be noted that: the above embodiments are merely intended to illustrate rather than limit the technical solutions of the present application; and although the present application is concretely described in reference to the foregoing embodiments, those skilled in the art should understand that, modifications can still be made to the technical solutions recorded in the foregoing embodiments, or that equivalent substitutions can still be made to part or all of the technical features and the like; and neither these modifications nor these substitutions shall make the essence of the corresponding technical solutions deviate from the scope of the technical solutions in the embodiments of the present application.

What is claimed is:

1. A data processing method for a preset application in a terminal comprising a data partition and a system partition, comprising:
   after upgrading the preset application, comparing a first application package of the preset application after upgrading in the data partition with a second application package of the preset application before upgrading in the system partition;
   deleting each file in the first application package which is identical with that in the second application package in accordance with a comparison result;
   after the deleting, adding reduction identification information in the first application package, wherein the reduction identification information is used for: when the preset application after upgrading is started, a program file is loaded from the first application package after the deleting and the second application package, respectively, in accordance with the reduction identification information.

2. The method in accordance with claim 1, wherein, before the comparing the first application package of the preset application after upgrading in the data partition with the second application package of the preset application before upgrading in the system partition, the method further comprises:
   decompressing the first application package, to acquire files of the first application package after decompressing;
   decompressing the second application package, to acquire files of the second application package after decompressing;
   wherein the comparing the first application package of the preset application after upgrading in the data partition with the second application package of the preset application before upgrading in the system partition, comprises:
   comparing the files of the first application package after decompressing with the files of the second application package after decompressing.

3. The method in accordance with claim 2, wherein, the deleting each file in the first application package which is identical with that in the second application package in accordance with the comparison result comprises:
   deleting each file in the first application package after decompressing which is identical with that in the second application package after decompressing in accordance with the comparison result.

4. The method in accordance with claim 3, wherein, after the deleting each file in the first application package after decompressing which is identical with that in the second application package after decompressing in accordance with the comparison result, the method further comprises:
   compressing remaining file of the first application package in the data partition, to acquire a third application package, and replacing the first application package after the deleting according to the third application package.

5. The method in accordance with claim 1, wherein, before the comparing the first application package of the preset application after upgrading in the data partition with the second application package of the preset application before upgrading in the system partition, the method further comprises:
   determining whether the first application package contains the reduction identification information.

6. The method in accordance with claim 1, further comprising:
   determining whether the first application package contains the reduction identification information when the preset application after upgrading is started;
   if the first application package does contain the reduction identification information, loading the program file from the first application package after the deleting and the second application package, respectively, in accordance with the reduction identification information.

7. A terminal, comprising: a memory, configured to store instructions; and a processor, coupled with the memory and configured to execute the instructions stored in the memory, and configured to:
   compare a first application package of the preset application after upgrading in a data partition with a second application package of the preset application before upgrading in a system partition, after upgrading the preset application, wherein the data partition and the system partition are comprised in the terminal;
   delete each file in the first application package which is identical with that in the second application package in accordance with a comparison result; and
   after the deleting, add reduction identification information in the first application package, wherein the reduction identification information is used for: when the preset application after upgrading is started, a program file is loaded from the first application package after the deleting and the second application package, respectively, in accordance with the reduction identification information.

8. The terminal in accordance with claim 7, wherein, the processor is further configured to:
decompress the first application package, to acquire files of the first application package after decompressing;
decompress the second application package, to acquire files of the second application package after decompressing;
compare the file of the first application package after decompressing with the file of the second application package after decompressing.

9. The terminal in accordance with claim 8, wherein, the processor is further configured:
to compress remaining file of the first application package in the data partition, to acquire a third application package, and to replace the first application package after the deleting according to the third application package.

10. The terminal in accordance with claim 7, wherein, the processor is further configured:
to determine whether the first application package contains the reduction identification information when the preset application after upgrading is started;
if the first application package does contain the reduction identification information, to load program file from the first application package after the deleting and the second application package, respectively, in accordance with the reduction identification information.

11. A non-transitory computer readable medium, with a set of instructions stored thereon, enabling a machine to execute the data processing method of a preset application after upgrading when the set of instructions is executed, the method comprising:
after upgrading the preset application, comparing a first application package of the preset application after upgrading in a data partition with a second application package of the preset application before upgrading in a system partition, wherein the data partition and the system partition are comprised in a terminal;
deleting each file in the first application package which is identical with that in the second application package in accordance with a comparison result;
after the deleting, adding reduction identification information in the first application package, wherein the reduction identification information is used for: when the preset application after upgrading is started, a program file is loaded from the first application package after the deleting and the second application package, respectively, in accordance with the reduction identification information.

12. The non-transitory computer readable medium in accordance with claim 11, wherein, before the comparing the first application package of the preset application after upgrading in the data partition with the second application package of the preset application before upgrading in the system partition, further comprises:
decompressing the first application package, to acquire files of the first application package after decompressing;
decompressing the second application package, to acquire files of the second application package after decompressing;
the comparing the first application package of the preset application after upgrading in the data partition with the second application package of the preset application before upgrading in the system partition, comprises:
comparing the file of the first application package after decompressing with the file of the second application package after decompressing.

13. The non-transitory computer readable medium in accordance with claim 12, wherein, the deleting the file in the first application package which is identical with that in the second application package in accordance with a comparison result, further comprises:
deleting a file in the first application package after decompressing which is identical with that in the second application package after decompressing in accordance with the comparison result.

14. The non-transitory computer readable medium in accordance with claim 13, wherein, after the deleting the file in the first application package after decompressing which is identical with that in the second application package after decompressing in accordance with the comparison result, further comprises:
compressing remaining file of the first application package in the data partition, to acquire a third application package, and replacing the first application package after the deleting according to the third application package.

15. The non-transitory computer readable medium in accordance with claim 11, wherein, before the comparing the first application package of the preset application after upgrading in the data partition with the second application package of the preset application before upgrading in the system partition, further comprises:
determining whether the first application package contains the reduction identification information.

16. The method in accordance with claim 1, wherein, when a root permission is not acquired, data in the system partition is not permitted to be changed and data in the data partition is permitted to be changed when upgrading the preset application.

17. The terminal in accordance with claim 7, wherein, when a root permission is not acquired, data in the system partition is not permitted to be changed and data in the data partition is permitted to be changed when upgrading the preset application.

18. The non-transitory computer readable medium in accordance with claim 11, wherein, when a root permission is not acquired, data in the system partition is not permitted to be changed and data in the data partition is permitted to be changed when upgrading the preset application.

19. The method in accordance with claim 1, wherein, when the preset application after upgrading is started, a program file is loaded from the first application package after the deleting and the second application package, respectively, in accordance with the reduction identification information, resulting in releasing repeated occupation of storage space in the data partition.

20. The terminal in accordance with claim 7, wherein, when the preset application after upgrading is started, a program file is loaded from the first application package after the deleting and the second application package, respectively, in accordance with the reduction identification information, resulting in releasing repeated occupation of storage space in the data partition.

* * * * *